United States Patent
Elie et al.

(10) Patent No.: US 7,467,697 B2
(45) Date of Patent: Dec. 23, 2008

(54) ELECTROMAGNETIC COUPLING DEVICE FOR ENGINE ACCESSORIES

(75) Inventors: Larry D. Elie, Ypsilanti, MI (US); John M. Ginder, Plymouth, MI (US); Clay W. Maranville, Ypsilanti, MI (US); Luis Pugliese, Troy, MI (US); Wallace E. Beaber, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 285 days.

(21) Appl. No.: 11/163,186

(22) Filed: Oct. 7, 2005

(65) Prior Publication Data

US 2007/0080037 A1   Apr. 12, 2007

(51) Int. Cl.
*F16D 35/00* (2006.01)
*F16H 9/04* (2006.01)

(52) U.S. Cl. ................. 192/21.5; 474/70; 123/198 R
(58) Field of Classification Search ............. None
See application file for complete search history.

(56) References Cited

U.S. PATENT DOCUMENTS

| | | | |
|---|---|---|---|
| 3,088,566 A * | 5/1963 | Fleming | 192/58.3 |
| 4,611,697 A * | 9/1986 | Okita et al. | 192/21.5 |
| 5,049,112 A | 9/1991 | Gunsing | |
| 5,611,416 A | 3/1997 | Berger et al. | |
| 5,879,254 A | 3/1999 | Tanaka | |
| 6,026,709 A * | 2/2000 | Depp et al. | 74/573.12 |
| 6,044,943 A | 4/2000 | Bytzek et al. | |
| 6,173,823 B1 | 1/2001 | Moser et al. | |
| 6,290,043 B1 | 9/2001 | Ginder et al. | |
| 6,318,531 B1 * | 11/2001 | Usoro et al. | 192/21.5 |
| 6,619,453 B2 | 9/2003 | Stretch | |
| 6,668,995 B2 | 12/2003 | Janson et al. | |
| 6,793,059 B2 | 9/2004 | Okada et al. | |
| 7,004,136 B2 * | 2/2006 | Garabello et al. | 123/179.28 |

(Continued)

FOREIGN PATENT DOCUMENTS

JP          6-264940          9/1994

(Continued)

OTHER PUBLICATIONS

U.S. Appl. No. 11/163,173, filed Oct. 7, 2005, "Electromagnetic Coupling Device Having Conducting Bearing and Lubricant".

(Continued)

*Primary Examiner*—Richard M. Lorence
(74) *Attorney, Agent, or Firm*—Julia Voutyras; Brooks Kushman P.C.

(57) ABSTRACT

A system and method for controlling a plurality of accessories associated with a multiple cylinder internal combustion engine having the accessories coupled to an engine crankshaft by an electromagnetic coupling device with a flowable magnetic material disposed between a driving member and a driven member include selectively supplying power to the electromagnetic coupling device in response to at least one operating condition to simultaneously engage or disengage the plurality of engine accessories. Embodiments include a magnetic particle clutch or magnetorheological fluid clutch connected to an engine crankshaft and a plurality of engine accessories that may include an air conditioning compressor, water pump, power steering pump, alternator, and/or supercharger, for example.

17 Claims, 3 Drawing Sheets

U.S. PATENT DOCUMENTS

2004/0188198 A1    9/2004   Na

FOREIGN PATENT DOCUMENTS

JP    10-281181    10/1998
JP    2004-68999    3/2004

OTHER PUBLICATIONS

Nye Lubricants, "LubeLetter", vol. 25, No. 1, 1997.
Nye Lubricants, "Lubeletter", vol. 31, No. 3, 2003.
Nicole St. Pierre, Jay Weikel, "Capturing the Synergistic Effect of Additives To Formulate a Long-Life, Electrically Conductive Bearing Grease", Appliance Design and Technology Expo, Oct. 15-17, 2002, Cincinnati, Ohio.

* cited by examiner

ELECTROMAGNETIC COUPLING DEVICE FOR ENGINE ACCESSORIES

BACKGROUND OF THE INVENTION

1. Field of the Invention

The present invention relates to systems and methods for coupling accessories to an engine/motor.

2. Background Art

Devices attached to the front-end accessory drive (FEAD) of an engine/motor in a vehicle consume power that could otherwise be directed to motoring the vehicle. Typical accessories may include a power steering pump, water pump, alternator, air conditioning compressor, air compressor, power-take off (PTO) drive, air for an induction blower, or a supercharger, for example. Various engine/motor accessories may be engaged/disengaged based on a request from the vehicle operator and/or the engine/vehicle controller in response to current ambient and vehicle operating conditions. However, each device is generally controlled independently of the state of other devices.

In automotive applications, electromagnetic friction clutches are often used to selectively engage various belt-driven FEAD devices. During engagement these clutches use an electrically controlled magnetic field to bring opposing frictional disks or plates into contact, which creates a rapid transfer of angular velocity to the driven clutch plate(s) that may result in undesirable noise, vibration, and harshness. In addition, the rapid transfer of torque to the engaged device often creates a rapid and noticeable diversion of torque from powering the engine and transmission. In addition, wearing of the frictional surfaces during engagement will eventually reduce the torque transfer capacity of the device.

More recently, magnetic powder or magnetorheological (MR) fluid clutches have been used in various automotive applications. Magnetic powder or MR fluid clutches have various advantages over electromagnetic friction clutches including the ability to operate in a slip or partial engagement condition, particularly during engagement and disengagement. This reduces the instantaneous power drop (stumble) or power increase (surge) in the engine, which also reduces the level of noise and vibration generated during engagement. While, magnetic powder or MR fluid clutches have been used to selectively couple an engine accessory to the FEAD as disclosed in U.S. Pat. No. 6,290,043 (air conditioning compressor); U.S. Pat. No. 6,619,413 (supercharger); and U.S. Pat. No. 6,173,823 (cooling fan), various engine/vehicle ambient and operating conditions exist where it may be advantageous to coordinate control of multiple or all FEAD devices, such as during vehicle acceleration events, transmission upshift/downshift events, cruise control, high engine speed events, cold-start events, etc.

SUMMARY OF THE INVENTION

A system and method for controlling a plurality of accessories associated with a multiple cylinder internal combustion engine having the accessories coupled to an engine crankshaft by an electromagnetic coupling device with a flowable magnetic material disposed between a driving member and a driven member include selectively supplying power to the electromagnetic coupling device in response to at least one operating condition to simultaneously engage or disengage the plurality of engine accessories.

Embodiments of the present invention include systems and methods having a magnetic particle clutch or magnetorheological fluid clutch with a driving or input member connected to an engine crankshaft and a driven or output member connected to a plurality of engine accessories that may include an air conditioning compressor, air compressor, PTO drive, air for an induction blower, water pump, power steering pump, alternator, and/or supercharger, for example. The plurality of engine accessories is simultaneously engaged or disengaged by actuation of the magnetic particle/powder clutch in response to one or more engine and/or ambient operating conditions. One embodiment includes an electromagnetic coupling device having at least one electrically conductive bearing assembly with conductive lubricating grease to provide an electrical current path to an embedded electromagnet coil within a rotating member of the device.

The present invention provides a number of advantages. For example, the present invention includes an electromagnetic coupling device having a controllable engagement/disengagement to provide a soft-start/stop capability for an accessory drive, such as a front end accessory drive (FEAD) associated with an internal combustion engine. The ability to operate in a transient slip condition between engagement and disengagement reduces instantaneous power drop (stumble) or power increase (surge) in the engine, as well as reducing noise and vibration during engagement. The soft-start/stop capability for simultaneous coupling/decoupling of multiple engine accessories reduces wear on the clutch and various engine components, such as the drive belt, for example. The ability to simultaneously control engagement/disengagement of the entire FEAD according to the present invention facilitates control strategies that can respond to current ambient and/or operating conditions, modes, or events. Appropriate control of one or more accessory drive clutches each coupled to two or more accessories according to the present invention can temporarily reduce or eliminate the power required to operate all FEAD-driven (and/or other auxiliary drive) devices along with their associated rotational inertia to enhance engine/vehicle response and performance. As such, a smaller engine may be used to obtain similar vehicle launch performance resulting in improved fuel economy. In addition selectively disengaging engine accessories during times of inefficient operation, such as when they are fractionally loaded, and subsequently engaging the accessories when they can operate at higher load and higher efficiency may also contribute to improved fuel economy.

The above advantages and other advantages and features of the present invention will be readily apparent from the following detailed description of the preferred embodiments when taken in connection with the accompanying drawings.

DETAILED DESCRIPTION OF THE PREFERRED EMBODIMENT(S)

As those of ordinary skill in the art will understand, various features of the present invention as illustrated and described with reference to any one of the Figures may be combined with features illustrated in one or more other Figures to produce embodiments of the present invention that are not explicitly illustrated or described. The combinations of features illustrated provide representative embodiments for typical applications. However, various combinations and modifications of the features consistent with the teachings of the present invention may be desired for particular applications or implementations.

Figure 1:
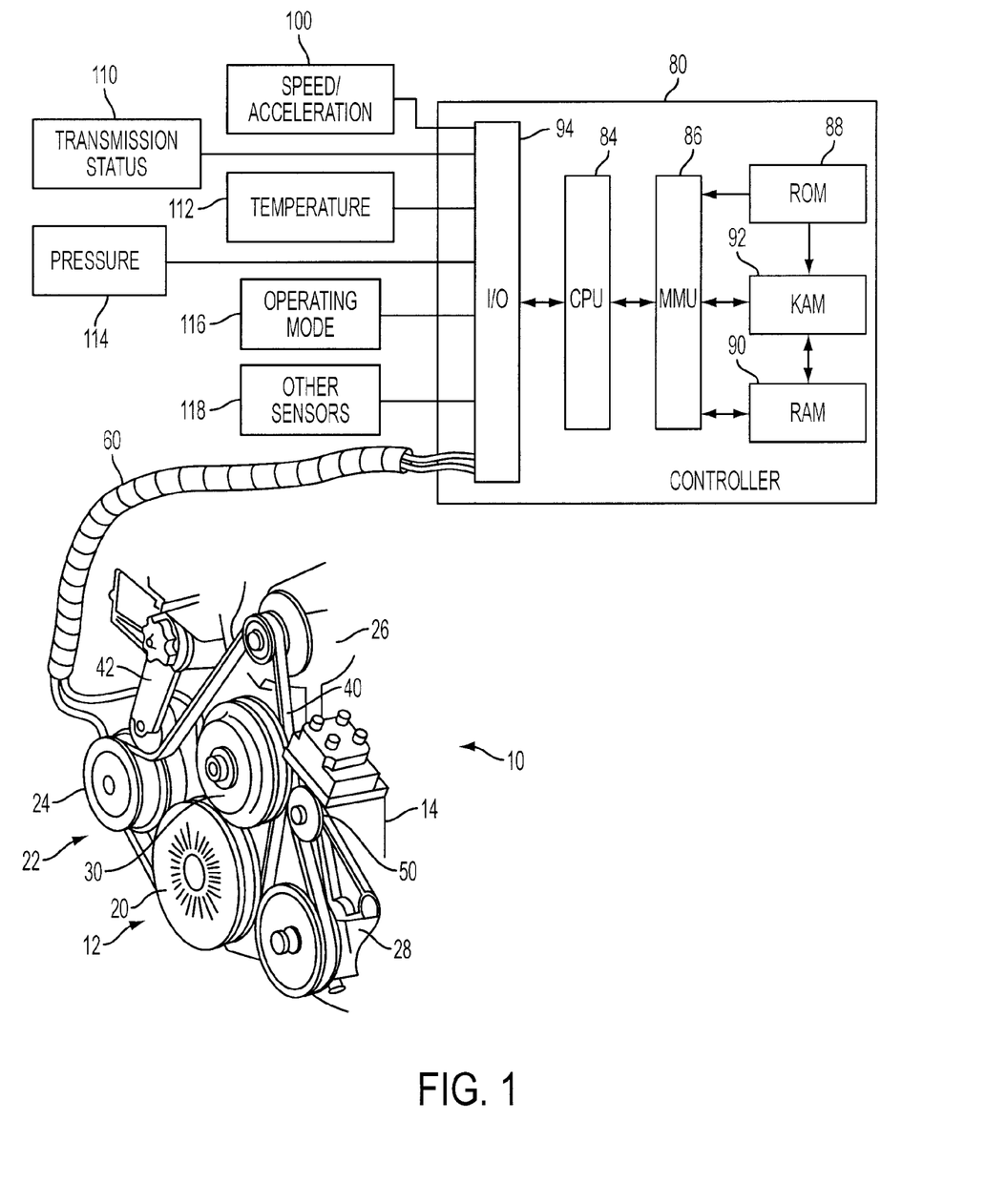
FIG. 1 illustrates a representative automotive application of one embodiment for a system and method for controlling engine accessories according to the present invention.

FIG. 1 illustrates a representative automotive application of one embodiment for a system and method for controlling engine accessories according to the present invention. As illustrated in FIG. 1, system 10 includes a front-end accessory drive (FEAD) 12 connected to a multiple cylinder internal combustion engine 14, only a portion of which is shown. While illustrated with respect to an automotive application having an internal combustion engine 14 to power FEAD 12, the present invention may also be used in a variety of other applications that may use an internal combustion engine or electric motor to power various engine/motor accessories. Likewise, while illustrated with respect to a FEAD having only one main clutch to engage/disengage multiple engine accessories, the present invention may also be used in applications having two or more FEADs each using a common belt or other device to drive at least two engine accessories. Similarly, the present invention may also be used for rear-end accessory drives and other accessory drives powering multiple accessories from a common clutch and is not limited to FEAD applications.

In the embodiment of FIG. 1, FEAD 12 includes an electrically controllable magnetic coupling device 20 implemented by a magnetic powder electromagnetic clutch. Other controllable coupling devices having the ability to operate in a slip condition may also be used, such as a magnetorheological fluid (MR) clutch, or similar device, to provide a soft-start/stop capability which reduces noise, vibration and harshness in addition to reducing wear of various engine components according to the present invention.

Figure 2:
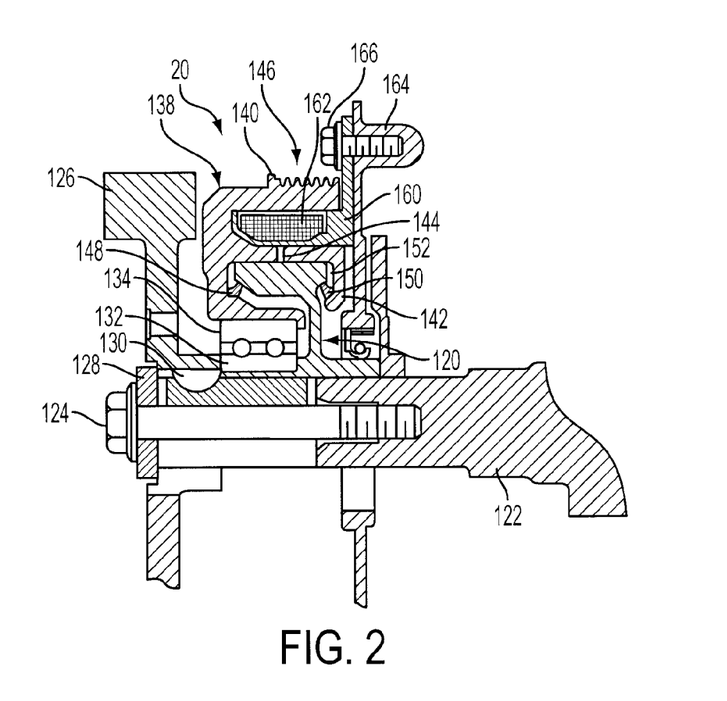
FIG. 2 is a partial cross-section illustrating a fixed coil embodiment of an electromagnetic clutch for a system or method for controlling the FEAD according to the present invention.
Figure 3:
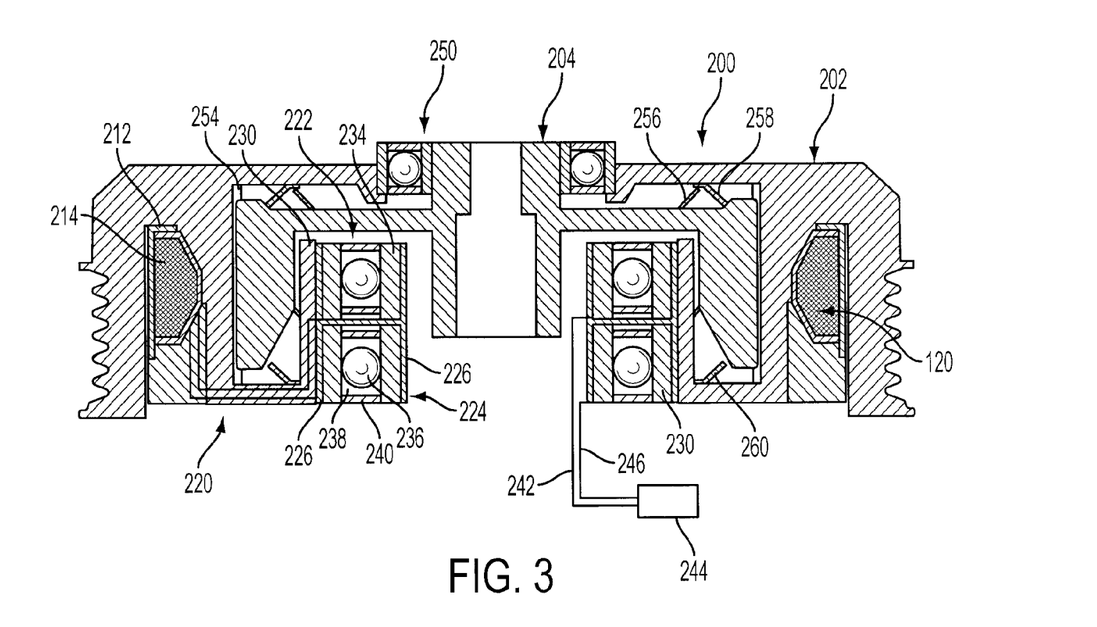
FIG. 3 is a cross section illustrating a rotating coil embodiment of an electromagnetic clutch with a conductive bearing assembly for a system or method for controlling engine accessories according to the present invention.

Electromagnetic coupling device 20 includes a driving member connected to the crankshaft (FIG. 2) of engine 14 and driven member coupled to the driving member by a controllable magnetic field so that the driven member rotates with the driving member when desired. Coupling device 20 may be implemented by a normally engaged device or a normally disengaged device. A normally engaged device includes a magnetic field created by permanent magnets to couple the driving and driven members when no power is supplied to the device. An electromagnet is then used to create an opposing magnetic field to decouple or disengage the clutch when power is provided to the device. A normally disengaged device as illustrated in FIGS. 2 and 3 does not have permanent magnets, but uses an electromagnet to couple the driving and driven members when power is supplied to the device.

As illustrated in FIG. 1, electromagnetic coupling device 20 is coupled to a plurality of engine accessories, generally represented by reference numeral 22. Engine accessories may include an air conditioning compressor 24, alternator 26, power steering pump 28, and water pump 30, for example. Of course, the number, type, and location of various engine/motor accessories will vary depending upon the particular application and implementation. In the embodiment illustrated, a common drive belt 40 is used to power or drive all engine accessories 22 when engine 14 is operating and clutch 20 is engaged. However, as described above, multiple drive belts or similar devices may be connected to a single clutch 20. Similarly, two or more clutches 20 may be provided with each connected to at least two engine accessories according to the present invention. In the embodiment illustrated, drive belt 40 passes around pulleys associated with each engine accessory, a belt tensioner 42, and one or more idler pulleys 50. Belt 40 may include one or more grooves, teeth, or similar devices that cooperate with each pulley or other drive element to reduce slipping. However, those of ordinary skill in the art will recognize that the present invention is independent of the particular type of device used to drive or connect engine accessories 22 to coupling device 20. Depending upon the particular application and implementation, one or more engine accessories 22 may also include an individually controllable clutch or similar device to selectively power that accessory.

System 10 may include a wiring harness 60 or similar device to provide an electrical connection for selectively supplying power to one or more devices of FEAD 12. In the embodiment of FIG. 1, wiring harness 60 directly or indirectly connects engine controller 80 to various engine sensors and actuators including coupling device 20 and air conditioning compressor 24, for example. As described in greater detail herein, controller 80 selectively supplies power to coupling device 20 via harness 60 in response to at least one operating condition to simultaneously engage a plurality of engine accessories 22.

Controller 80 has a microprocessor 84, also referred to as a central processing unit (CPU), in communication with memory management unit (MMU) 86. MMU 86 controls the movement of data among the various computer readable storage media and communicates data to and from CPU 84. The computer readable storage media may include volatile and nonvolatile storage in read-only memory (ROM) 88, random-access memory (RAM) 90, and keep-alive memory (KAM) 92, for example. KAM 92 may be used to store various operating variables while CPU 84 is powered down. The computer-readable storage media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by CPU 84 in controlling the engine or vehicle into which the engine is mounted. The computer-readable storage media may also include floppy disks, CD-ROMs, hard disks, and the like.

CPU 84 communicates with various sensors and actuators directly or indirectly via an input/output (I/O) interface 94. Interface 94 may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to CPU 84. Examples of items that may be actuated under control of CPU 84, through I/O interface 94, are fuel injection timing, fuel injection rate, fuel injection duration, throttle valve position, spark plug ignition timing (for spark-ignition engines), and others. Sensors communicating input through I/O interface 94 may be used to indicate engine (and/or vehicle) speed/acceleration 100, status or gear of an associated automatic or manual transmission 110, temperature (engine coolant, exhaust, transmission oil, and/or ambient, etc.) 112, pressure (oil, turbo boost, etc.) 114, and current operating mode 116 (cold start, warm-up, cruise, shut down, etc.), for example. Various other sensors 118 may also be provided and used to control engagement and disengagement of various engine accessories. For example, other sensors 118 may include a steering or wheel angle sensor to determine whether to engage the FEAD to operate the power steering pump. Some controller architectures do not contain an MMU 86. If no MMU 86 is employed, CPU 84 manages data and connects directly to ROM 88, RAM 90, and KAM 92. Of course, the present invention could utilize more than one CPU 84 to provide engine control and controller 80 may contain multiple ROM 88, RAM 90, and KAM 92 coupled to MMU 86 or CPU 84 depending upon the particular application.

In one embodiment, controller 80 executes instructions stored in one or more computer readable media to selectively supply power to electromagnetic coupling device 20 in response to current engine, vehicle, and/or ambient operating conditions to simultaneously engage or disengage engine accessories 22. Depending upon the particular application, several situations or operating conditions may exist where it is desirable to simultaneously disengage the plurality of engine accessories 22 so that power generated by engine 14 is not used by accessories 22 and may be used to power the vehicle or other device as illustrated and explained in greater detail with reference to FIG. 4.

FIG. 2 is a partial cross-section illustrating a fixed coil embodiment of a magnetic particle or MR fluid electromagnetic clutch for a system or method for controlling a FEAD according to the present invention. In this embodiment, the driving member of clutch 20 is implemented by driving member 120, which is secured to crankshaft 122 by bolt 124, washer 128, and harmonic damper 126. A keyway 130 is provided to rotationally position damper 126 and secure damper 126 for rotation with crankshaft 122 and inner race 132 of bearing 134. Depending on the particular application and implementation, damper 126 may be integrated into driving member 120 or another component that rotates with crankshaft 122 rather than being implemented by a separate component as illustrated in FIG. 2.

As also shown in FIG. 2, coupling device 20 includes a driven member 138 that includes a crank pulley 140 and pulley side cover 142 with an annular separator 144 disposed therebetween. Crank pulley 140 may include grooves 146 that cooperate with corresponding grooves in the drive belt to increase frictional surface area and reduce slipping. Driven member 138 and driving member 120 cooperate with seals 148 and 150 to create an annular space 152 containing a flowable magnetic material, such as a magnetic particle or powder, or a magnetorheological fluid. The flowable magnetic material in annular space 152 couples driven member 138 to driving member 120 when coupling device 20 is actuated as described in greater detail herein. Coil mounting bracket 160 secures fixed (non-rotating) coil 162 to engine front cover 164 via fasteners 166. Coil 162 is electrically connected to controller 80 (FIG. 1), which selectively supplies power to coil 162 during actuation of coupling device 20.

In operation, when coupling device 20 is deactivated or disengaged with the engine running, crankshaft 122 rotates driving member 120, inner race 132 of bearing 134, and damper 126. Driven member 138, which is coupled to a plurality of engine accessories via crank pulley 140 and drive belt 40 (FIG. 1) remains stationary along with fixed coil 162, which is not energized and therefore does not create sufficient magnetic flux to couple rotating driving member 120 to driven member 138. During actuation of coupling device 20, controller 80 (FIG. 1) generates a signal in response to at least one operating condition to selectively supply power to coupling device 20 by controlling the voltage or current provided to coil 162. When energized, coil 162 creates magnetic flux that extends through the flowable magnetic material in annular gap 152 polarizing the material and coupling driven member 138 to driving member 120 so that driven member 138 begins to rotate with driving member 120 and begins driving or powering the engine accessories coupled via the common drive belt. To provide a controlled engagement, controller 80 (FIG. 1) may generate a signal to modulate the power (voltage or current) supplied to coil 162. For example, the voltage or current could be ramped or generally linearly changed from a first value to a second value over a predetermined time period. Alternatively, voltage or current could be pulse width modulated, modulated with a particular constant duty cycle, stepped, etc. to control the slip or rate of engagement or coupling between driving member 120 and driven member 138.

FIG. 3 is a cross-section illustrating operation and construction of a coupling device having a rotating coil and at least one conductive bearing assembly for use in a system or method for controlling engine accessories according to one embodiment of the present invention. The rotating coil embodiment of FIG. 3 reduces part count and variable cost by using conductive lubricating grease in at least one conductive bearing assembly to provide a direct electrical current path to a rotating electromagnet coil. A direct connection through the bearing and grease eliminates brushes and/or slip rings and may therefore substantially improve reliability and durability relative to conventional rotating coil implementations. Positioning the coil within one of the rotating members instead of having a fixed coil as illustrated in FIG. 2 eliminates air gaps in the magnetic flux path to improve magnetic and corresponding electric efficiency so that a smaller, lighter coil with lower power requirements and less generated heat may be used. Elimination of air gaps also reduces manufacturing costs by eliminating tight-tolerance machining operations while improving heat conduction and clutch cooling such that higher slip tolerances may be accommodated.

As illustrated in FIG. 3, coupling device 200 includes a driving member 204 selectively coupleable to a driven member 202. Driving or rotating member 204 includes an embedded coil 210 disposed within a pocket or groove of rotating member 202 such that substantially the entire outer surface of coil 210 directly or indirectly contacts rotating member 202 to eliminate any air gaps in the magnetic flux path within rotating member 202. As illustrated in FIG. 2, indirect contact may be provided by a material 212 surrounding the coil wire 214 and having desired magnetic properties. Embedded coil 210 is electrically connected by wire lead(s) 220 to at least one electrically conductive bearing assembly. In the representative embodiment illustrated in FIG. 2, two conductive bearing assemblies 222, 224 are used to provide an electric current supply and return, respectively. However, some applications may only use a single conductive bearing assembly with a return current path provided by a conductive mount or mounting assembly.

Each conductive bearing assembly 222, 224 includes a conductive outer race 230 electrically insulated/isolated from rotating member 202 by one or more insulators 226, which also isolate conductive bearing assemblies 222, 224 from a stationary mounting shaft or assembly (not shown) that supports inner race 234. Conductive bearing assemblies 224, 226 each include a plurality of rolling or roller elements 236 surrounded by a conductive lubricant 238 and contained by corresponding seals 240. Inner race 234 of at least one bearing assembly 222, 224 is connected to a lead wire 242 that terminates at connector 244 to connect an external current source (not shown) to supply electrical current during actuation of device 200. A second lead wire 246 may also be provided and connected to a corresponding inner race and connector 244 to provide a return current path.

Depending on the particular application, a third bearing assembly 250 may be positioned between driving or rotating member 204 and second or driven member 202 to provide additional structural support and allow relative rotation therebetween. Bearing assembly 250 does not require electrical conductivity, but may also be implemented by a conductive bearing assembly if desired.

Depending upon the particular application, a grease filled bushing having conductive concentric inner and outer members defining an annular space filled with conductive lubricating grease may be used in place of one or more of the conductive bearing assemblies to provide a current path to/from an embedded coil. Conductive grease filled bushings would not have any rolling elements between the inner and outer concentric rings. In general, a conductive grease filled bushing would be suitable for lower rotational speed applications.

As also shown in FIG. 3, a flowable magnetic material 254 is disposed in a space between rotating member 202 and second member 204. Flowable magnetic material 254 may be any of a number of suitable magnetic particles/powders or magnetorheological fluids that become polarized in a magnetic field and provide coupling of rotating member 202 and second member 204 during actuation of device 200. One or more seals and/or baffles 256, 258, 260 operate to substantially contain the flowable magnetic material in the space between members 202 and 204.

Use of a magnetorheological fluid or magnetic particle clutch provides the ability to tolerate slip between the driving and driven members to control substantially simultaneous engagement of a plurality of engine accessories according to the present invention. Appropriate control of the power supplied to coil 214 may be used to provide a soft start/engagement to reduce noise, vibration, and harshness. In these types of applications, heat generated by the slip may be many times greater than resistive heat generated by operation of the coil and the additional heat must be dissipated. Prior art clutch/brake designs that have one or more air gaps generally try to reduce the size of the air gap due to the effect on the magnetic and corresponding electric efficiency. However, small air gaps limit air circulation and the efficacy of forced-air convective cooling. In addition, the air gaps also inhibit conductive cooling. Use of one or more conductive bearings or bushings according to one aspect of the present invention allows the coil to be embedded in the rotating member and eliminates one or more air gaps to improve conductive cooling and corresponding heat dissipation so that slip tolerances can be significantly increased.

In operation, coupling device 200 provides selective coupling between rotating or driving member 204 and second or driven member 202 by supplying an electric current to embedded coil 210 through at least one conductive bearing or bushing assembly 224 having conductive lubricant 238. Coil 210 generates a magnetic field that passes through rotating member 202, flowable magnetic material 254, and second member 204 to couple second member 204 to rotating member 202.

Figure 4:
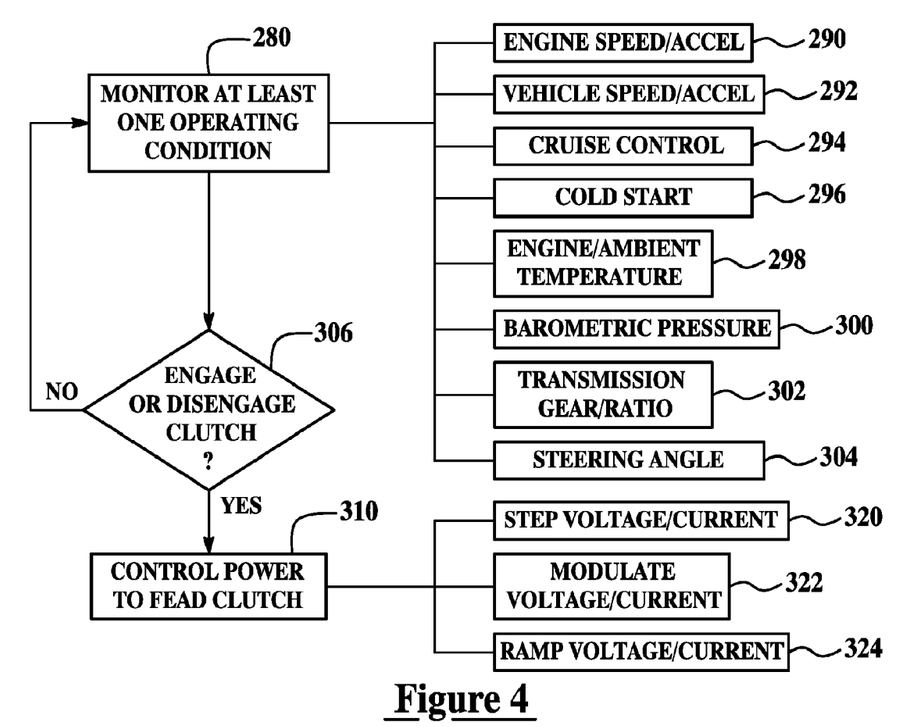
FIG. 4 is a flow chart illustrating operation of a system or method for controlling engine accessories according to various embodiments of the present invention.

FIG. 4 is a flow chart illustrating operation of a system or method for controlling an accessory drive having a plurality of accessories coupled to an engine/motor via an electromagnetic coupling device having a flowable magnetic material disposed between driving and driven members according to one embodiment of the present invention. As will be appreciated by one of ordinary skill in the art, the diagram of FIG. 4 represents operation of a representative application with a controller in communication with one or more sensors and the electromagnetic coupling device to selectively engage a plurality of engine accessories in response to at least one engine, vehicle, and/or ambient operating condition.

The control system and/or controller may use any of a number of known processing strategies such as event-driven, interrupt-driven, multi-tasking, multi-threading, and the like. As such, various steps or functions illustrated may be performed in the sequence illustrated, in parallel, or in some cases omitted. Although not explicitly illustrated, one of ordinary skill in the art will recognize that one or more of the illustrated steps or functions may be repeatedly performed. Similarly, the order of processing is not necessarily required to achieve the features, and advantages of the invention, but is provided for ease of illustration and description. Control of a representative embodiment may be implemented in software executed by a microprocessor-based vehicle, engine, and/or powertrain controller, such as controller 80 (FIG. 1). Of course, the control may be implemented in software, hardware, or a combination of software and hardware depending upon the particular application. When implemented in software, the control logic is preferably provided in one or more computer-readable storage media having stored data representing code or instructions executed by a computer or microprocessor to monitor and control the system. The computer-readable storage media may be any of a number of known physical devices which utilize electric, magnetic, optical and/or combination storage to keep executable instructions and associated calibration information, operating variables, and the like as previously described.

At least one operating condition is monitored as represented by block 280. The operating condition or conditions may be determined based on various sensors that may be used to determine engine rotational speed and/or acceleration 290, vehicle speed and/or acceleration 292, cruise control status 294, emissions system status 296, engine and/or ambient temperature(s) 298, barometric pressure 300 (or other operating pressure(s)), and transmission gear and/or ratio 302, and steering angle 304, for example. The operating condition or conditions that are monitored and the sensor(s) used to monitor the conditions will vary by application. The at least one operating condition is used to determine when and/or how quickly to engage/disengage the FEAD as represented generally by block 306. If a change in the operating condition(s) indicates a change in state of the FEAD clutch is desired in response to the operating condition(s), block 310 controls the power supplied to the FEAD clutch to engage or disengaged the clutch. Depending upon the particular application, the engagement may use various voltage and/or current controls to supply a stepped voltage/current 320, to modulate the voltage/current 322, or provide a ramped voltage/current 324. For many automotive applications, it is desirable to control power supplied to the FEAD clutch to provide a rapid disengagement to quickly provide additional torque for the associated engine/motor while providing a slower engagement to provide a smoother transition that is less noticeable to the operator.

The present invention is independent of the particular logic or steps used to determine when to engage/disengage the FEAD as the logic is specific to a particular application. However, some representative control strategies are provided herein as examples to illustrate the invention. As one example, the FEAD clutch may be disengaged in response to an operator depressing the accelerator pedal beyond a predetermined rate or position to provide additional torque for accelerating the vehicle. The FEAD clutch is then subsequently engaged either based on a predetermined time, or when the accelerator pedal is returned to a position or rate below a predetermined threshold with appropriate hysteresis. In another example, the FEAD clutch may be disengaged when the engine is in a cold start mode or periodically disengaged and re-engaged when a vehicle is operating in a cruise control mode. Likewise, the FEAD or other accessory drive controlling at least two engine accessories may be disengaged with the corresponding accessories would otherwise be operating inefficiently, such as when operating at part-load or fractionally loaded, and subsequently engaged when the accessories can be operated at higher load or full load where they are generally more efficient. This type of control strategy according to the present invention may be used to improve fuel economy by effectively engaging the accessories and storing energy in the various accessories when the accessories are operating in a higher efficiency region and subsequently using the stored energy while the accessories are disengaged and would otherwise be operated in a low efficiency region.

Figure 5:
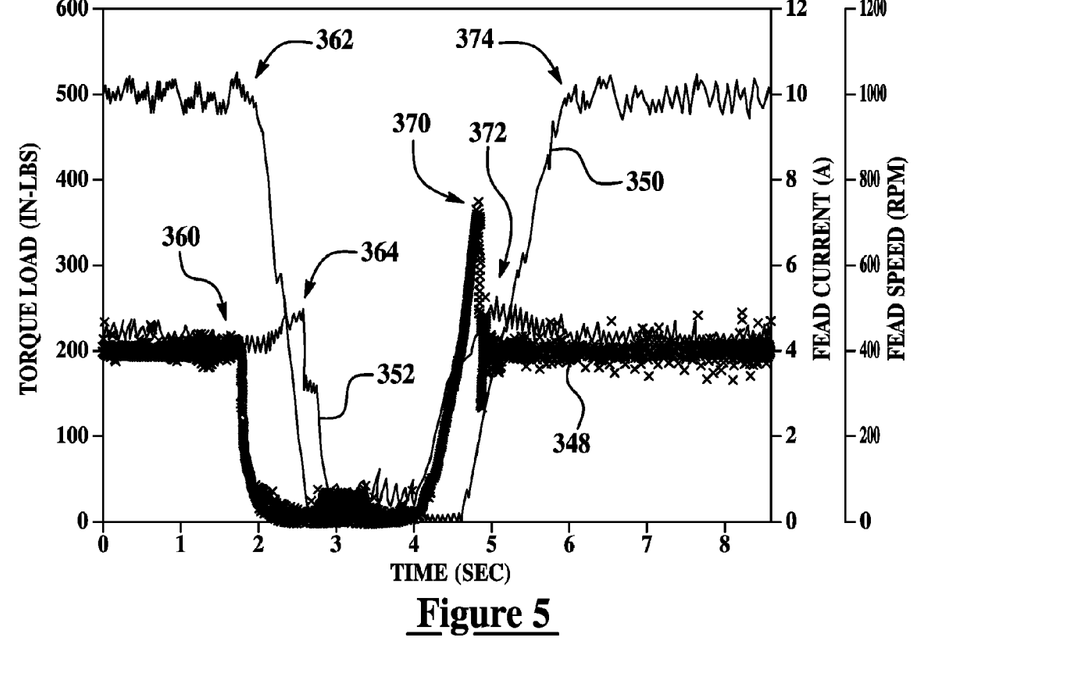
FIG. 5 is a graph illustrating operation of a system or method for controlling engine accessories according to one embodiment of the present invention.

FIG. 5 is a graph illustrating a FEAD clutch disengagement with subsequent engagement in response to at least one operating condition with a substantially constant engine crankshaft speed according to one embodiment of the present invention. Line 348 represents the FEAD clutch coil current in amperes (A), line 350 represents rotational speed of one of the engine accessories driven by a common drive belt driving an air conditioning compressor, alternator, power steering pump, and water pump, and line 352 represents the FEAD torque load in inch-pounds. As illustrated in the graph of FIG. 5, power supplied to the FEAD clutch is controlled in response to a simulated operating condition by reducing the current from about four amps at 360 to nominally zero. This causes a corresponding decrease in the magnetic flux coupling the driving and driven members of the FEAD clutch such that the clutch quickly begins to slip and the rotational speed decreases as indicated at 362, followed by a corresponding decrease in torque load at 364 while the engine (crankshaft) speed is substantially constant (not shown). After a predetermined elapsed time, or in response to a change in the operating condition(s), the FEAD clutch is subsequently engaged by increasing current at 370. This results in an increase in the magnetic flux within the FEAD clutch that couples the driving member to the driven member to increase the torque load at 372 and the rotational speed returns to the fully engaged speed at 374.

As illustrated in FIG. 5, disengagement of the FEAD clutch provides the engine with an additional 200 in-lbs of torque that would otherwise be used to power the various engine accessories attached to the FEAD in this particular example.

As such, appropriate control of a FEAD clutch to simultaneously engage/disengage a plurality of engine accessories according to the present invention can temporarily reduce or eliminate the power required to operate all FEAD-driven devices along with their associated rotational inertia to enhance engine/vehicle response, performance, and fuel economy. The controllable soft-start/stop capability provided by magnetic particle/powder or MR fluid devices according to the present invention facilitates operation in a transient slip condition to reduce instantaneous power drop (stumble) during engagement and instantaneous power increase (surge) in the engine during disengagement, as well as reducing associated noise and vibration. The soft-start/stop capability for simultaneous coupling/decoupling of multiple engine accessories also reduces wear on the clutch and various engine components, such as the drive belt, for example. In addition, the ability to simultaneously control engagement/disengagement of the entire FEAD according to the present invention facilitates control strategies that can respond to current ambient and/or operating conditions, modes, or events.

While the best mode for carrying out the invention has been described in detail, those familiar with the art to which this invention relates will recognize various alternative designs and embodiments for practicing the invention as defined by the following claims.

What is claimed is:

1. A method for controlling a plurality of accessories associated with a multiple cylinder internal combustion engine, the accessories coupled to an engine crankshaft by an electromagnetic coupling device with a flowable magnetic material disposed between a driving member and a driven member, the method comprising:

monitoring at least one operating condition to determine whether to simultaneously engage or disengage the plurality of engine accessories while the engine is running;

decreasing power to the electromagnetic coupling device over a first time period when disengagement is determined in response to the at least one operating condition to simultaneously disengage the plurality of engine accessories; and increasing power to the electromagnetic coupling device over a second time period when engagement is determined in response to the at least one operating condition to simultaneously engage the plurality of engine accessories;

wherein the second time period is longer than the first time period to provide a rapid disengagement and smooth engagement of the plurality of accessories.

2. The method of claim 1 wherein the electromagnetic coupling device comprises a magnetic particle clutch.

3. The method of claim 1 wherein the electromagnetic coupling device comprises a magnetorheological fluid clutch.

4. The method of claim 1 wherein increasing power comprises modulating current or voltage to control engagement of the electromagnetic coupling device.

5. The method of claim 1 wherein power is supplied and removed during engagement or disengagement, respectively, of the plurality of accessories by selectively supplying an electric current to a rotating coil embedded within one of the driving and driven members of the electromagnetic coupling device.

6. The method of claim 1 wherein the plurality of engine accessories includes at least two accessories selected from the group consisting of a power steering pump, a water pump, an alternator, an air conditioning compressor, a supercharger, and a turbocharger.

7. The method of claim 1 wherein the at least one current operating condition includes at least one of engine speed/acceleration, vehicle speed/acceleration, transmission status, and temperature.

8. The method of claim 1 wherein decreasing power comprises decreasing power to disengage the driving and driven members of the coupling device in response to an increased engine power demand to make additional torque available to the engine.

9. A system for controlling a plurality of accessories associated with a multiple cylinder internal combustion engine having a crankshaft, the system comprising:

an electromagnetic coupling device having a flowable magnetic material disposed between a driving member connected to the crankshaft and a driven member coupled to the plurality of accessories, the coupling device including a selectively actuated coil to generate a magnetic flux passing through the flowable magnetic material to couple or decouple the driving member and the driven member;

a controller in communication with the electromagnetic coupling device having instructions for monitoring engine operating conditions to determine when additional engine torque is desired, the controller decreasing power supplied to the electromagnetic coupling device over a first time period to rapidly disengage the plurality of accessories when additional engine torque is desired and subsequently increasing power supplied to the electromagnet coupling device over a second time period greater than the first time period to smoothly engage the plurality of accessories.

10. The system of claim 9 wherein the flowable magnetic material comprises magnetic particles.

11. The system of claim 9 wherein the flowable magnetic material comprises a magnetorheological fluid.

12. The system of claim 9 further comprising a damper connected to the crankshaft for rotation with the driving member.

13. The system of claim 12 wherein the damper is integrally formed with the driving member.

14. The system of claim 12 wherein the selectively actuated coil is embedded within one of the driving and driven members.

15. The system of claim 14 wherein the electromagnetic coupling device includes at least one conductive bearing assembly to provide an electrical current path to the embedded coil.

16. A multiple cylinder internal combustion engine having a reciprocating piston disposed within each cylinder coupled to provide rotation of a crankshaft during operation, the engine comprising:

an electromagnetic clutch having a flowable magnetic material disposed between a driving member connected for rotation with the crankshaft and a driven member selectively coupled or uncoupled with the driving member by an electrically controllable magnetic field passing through the flowable magnetic material;

a plurality of engine accessories coupled to the driven member for rotation therewith; and a control module in communication with the electromagnetic clutch to selectively disengage the driven member and plurality of engine accessories within a first time period in response to a determination that additional engine torque is desired, and to engage the driven member and plurality of engine accessories by increasing power supplied to the electromagnetic clutch from a first value to a second value over a second time period greater than the first time period.

17. The engine of claim 16 wherein the flowable magnetic material comprises magnetic particles and wherein the electromagnetic clutch comprises at least one conductive bearing assembly to provide electric current to a coil embedded in the driving member during actuation of the clutch.

* * * * *